United States Patent [19]
Kim

[11] Patent Number: 5,971,579
[45] Date of Patent: Oct. 26, 1999

[54] UNIT AND METHOD FOR DETERMINING GAINS A OF PID CONTROLLER USING A GENETIC ALGORITHM

[75] Inventor: Young-Sang Kim, Suwon, Rep. of Korea

[73] Assignee: Samsung Electronics Co., Ltd., Seoul, Rep. of Korea

[21] Appl. No.: 08/827,708

[22] Filed: Apr. 8, 1997

[30] Foreign Application Priority Data

Apr. 8, 1996 [KR] Rep. of Korea ...... 96-10513

[51] Int. Cl.⁶ ............................................. G05B 13/02
[52] U.S. Cl. .......................... 364/162; 364/161; 364/157; 364/165
[58] Field of Search ................... 364/157, 158, 364/159, 160, 161, 162–166, 167.11; 318/561, 609, 610; 395/3, 61, 900, 906, 902, 22, 23, 903

[56] References Cited

U.S. PATENT DOCUMENTS

| | | | |
|---|---|---|---|
| 4,669,040 | 5/1987 | Pettit et al. | 364/162 |
| 4,864,490 | 9/1989 | Nomoto et al. | 364/157 |
| 5,245,528 | 9/1993 | Saito et al. | 364/161 |
| 5,295,061 | 3/1994 | Katayama et al. | 364/157 |
| 5,311,421 | 5/1994 | Nomura et al. | 364/157 |
| 5,649,062 | 7/1997 | Teng et al. | 395/22 |

*Primary Examiner*—Reba I. Elmore
*Assistant Examiner*—Ramesh Patel
*Attorney, Agent, or Firm*—Staas & Halsey

[57] ABSTRACT

A unit and a method for determining gains of a PID (Proportion, Integral, Differential) controller using a genetic algorithm. A genetic algorithm tuning unit decodes an output value from an object system extracted by a feature extracting unit, and generates a first population including a random binary string. Then, the first population is normalized in a given ratio to measure a PID gain converting fitness with respect to the first population. Thereafter, the normalized first population is compared with the decoded value to determine whether it is a user's desired value. If the desired value is obtained, the genetic algorithm tuning unit generates PID gain control signals with respect to the resulting value, which are supplied to the PID controller to tune PID gains.

14 Claims, 3 Drawing Sheets

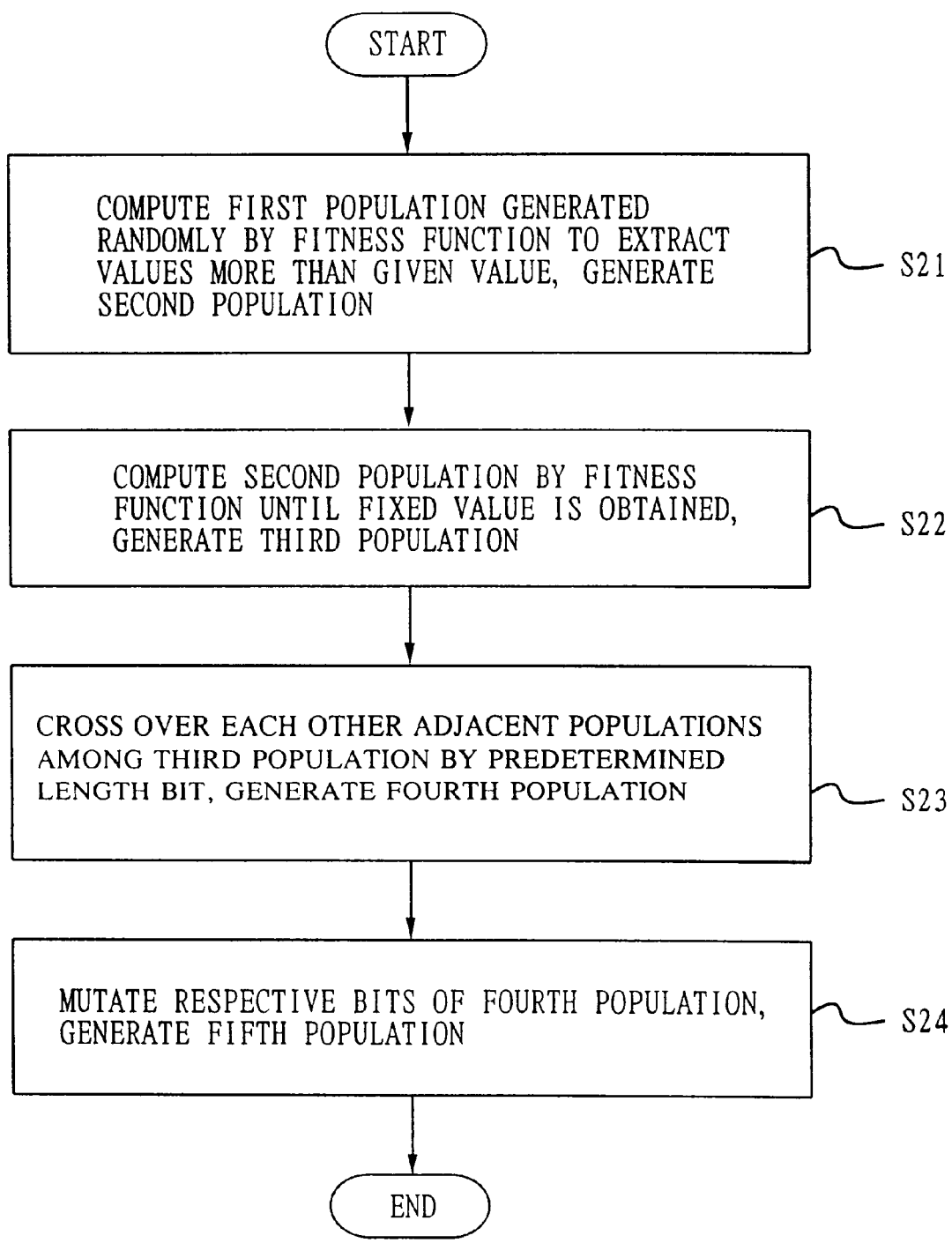

UNIT AND METHOD FOR DETERMINING GAINS A OF PID CONTROLLER USING A GENETIC ALGORITHM

BACKGROUND OF THE INVENTION

1. Field of the Invention

The present invention relates to a unit and a method for determining gains of a PID (Proportion, Integral, Differential) controller using a genetic algorithm. More particularly, the present invention relates to a unit and a method for determining gains of the PID controller using a genetic algorithm wherein control gains, i.e., PID gains to control an object system, are determined by means of a random search.

2. Description of the Prior Art

Generally, a PID controller is a controller of a type which has been used most widely in an industrial place. Since this PID controller is very sensitive to the object system, however, there is no exact theory or rule of determining proper PID gains for every object system. Further, even though a number of theories exist, it is possible to determine PID gains only when a mathematical model with respect to the object system exists. Therefore, unless the exact mathematical model exists, it is very difficult to determine the proper PID gains. Further, to determine the gains is very troublesome work which is accomplished by skilled specialists. This is accomplished through many trials and errors by the skilled specialists and many experiences for a long period of time. In PID control, determination of parameters for proportional gain, integral time, and differential time to improve a characteristic of the system is most important.

The PID control is to control simultaneously the proportional control mode, integral control mode, and differential control mode so that the system reaches a target value in a stable state within a fast period of time as soon as possible, when a difference between a reference input and an output value of the object system, i.e., a derivative, is input to an input element of the controller. In PID control, increase of the derivative is prevented in the integral control mode, and decrease of a remaining derivative is effected in the differential control mode. To increase a value of proportional gain enables the system to reach the target value within a fast period of time, but the system is unstable by producing a large overshot. To decrease a value of the proportional gain, on the other hand, enables a normal derivative to occur often, and thus, the need to automatically tune the PID control is rising.

One technique of automatically determining gain of the PID controller is disclosed in U.S. Pat. No. 5,295,061, entitled "Control parameter tuning unit and a method of tuning parameters for a control unit". This technique uses a fuzzy logic instead of a neural logic, thus being very expensive.

Further, another conventional technique is disclosed in "EXACT" by Foxbor company, 1975, available on the market. In this technique, after obtaining the model of the object system by monitoring the output of the object system, proper gain is obtained by mathematical computation from the obtained model, so that a response characteristic is very slow because of the emphasis on robustness with respect to disturbances.

The above technique of automatically determining the gain of the PID controller disclosed in U.S. Pat. No. 5,295,061 is now described with reference to FIG. 1.

Referring to FIG. 1, an automatic gain determining unit 5 includes a reference setting value inputting unit 10 for inputting reference data to control an output state of an object system 40, a fuzzy control unit 30 for comparing the reference data input through the reference setting value inputting unit 10 with output data of the object system 40, determining whether the output data of the object system 40 satisfies a user's setting value, and generating control signals to control PID gains if there is no satisfaction, and a PID controller 20 for converting the PID gains by the control signals output from the fuzzy control unit 30 to control the object system 40 by a control signal corresponding to the converted gains.

The fuzzy control unit 30 includes a fuzzy control knowledge base 30a storing fuzzy control rules and membership functions, and a fuzzy inference unit 30b effecting inference based on the fuzzy rules and membership functions stored in the fuzzy control knowledge base 30a.

An assumption is made that gain of the PID controller is set through a simple mathematical model of the object system 40. The reference setting value is input through the reference setting value inputting unit 10 so that the object system 40 is placed in any state. Then, the setting value is supplied to the fuzzy control unit 30 and the PID controller 20. If the PID controller 20 supplies the control signals to the object system 40, the object system 40 makes a control action in accordance with the input control signal to produce a changed output.

If a temperature is controlled, the reference input setting value comes to a temperature and the output of the object system 40 comes to a temperature.

The output is fed back to the fuzzy control unit 30 and the PID controller 20. Then, the fuzzy control unit 30 compares the reference setting value with the output of the object system 40 to determine whether the output of the object system 40 is satisfied with the user's setting value. If there is no satisfaction, after bringing out a necessary knowledge in the fuzzy control knowledge base 30a, and determining that any gain has to be changed to any extent through the fuzzy inference unit 30b, the gain of the PID controller 20 is changed.

Thus, the PID controller 20 operates to control the object system 40 with the changed gain.

Therefore, the fuzzy inference unit 30b requires some computing times. As a result of the fact that it takes some time for the fuzzy inference unit 30b to define a proper inference, a response velocity is lowered and, therefore, the automatic gain determining unit 5 can only be used in chemical reaction equipment or a water level controlling mechanism, etc., which does not require a high response velocity. Further, this unit requires the fuzzy control knowledge base 30a necessary for the fuzzy inference unit 30b and memories (DRAM, SRAM, or flash memory) storing the membership functions. Since the fuzzy inference unit 30b requires computing, a microprocessor having a large capacity is indispensable, thus raising a problem in that an inexpensive PID controller can not be manufactured.

SUMMARY OF THE INVENTION

Accordingly, it is an object of the present invention to provide a unit and a method for determining gains of a PID (Proportion, Integral, Differential) controller using a genetic algorithm so that three gains of the PID controller are determined through a random search to satisfy a user's desired specification.

According to the present invention, there is provided a unit for determining gains of a PID (Proportion, Integral, Differential) controller using a genetic algorithm comprising reference setting value inputting means for inputting reference data to determine a gain of an object system; feature extracting means for computing a difference between the reference data input through the reference setting inputting means and output data of the object system to extract a feature of the object system; genetic algorithm tuning means for tuning PID gains in response to an output value of the feature extracting means; and PID controlling means for generating a control input signal with respect to the object system relative to the tuned gains from the genetic algorithm tuning means.

The feature of the object system includes a difference between the reference data and the output of the object system, and the integral value, differential value, rising time, settling time, overshot, and damping ratio of the output of the object system.

The genetic algorithm tuning means includes random number generating means for generating a first population to control the PID gains, and the random number generating means comprises an amplifier for amplifying an input noise; a comparator for comparing the output signal of the amplifier with a reference signal to produce an output signal relative to an amplitude of the input noise; and signal converting means for converting the output signal from the comparator into a binary string.

According to another aspect of the present invention, there is provided a method for determining gains of a PID controller using a genetic algorithm comprising the steps of decoding an output value from an object system; generating a first population including a random binary string; normalizing the first population in a given ratio to measure PID gain converting fitness with respect to the first population; and comparing the normalized first population with the decoded value, determining whether the normalized first population is a desired value, and generating PID gain control signals with respect to the resulting value if the desired value is obtained.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the drawings:

FIG. 5 is a flow chart showing a method of normalizing a random binary string generated in FIG. 4.

DETAILED DESCRIPTION OF PREFERRED EMBODIMENT

Reference will now be made in detail to the preferred embodiment of the present invention, examples of which are illustrated in the accompanying drawings.

Figure 1:
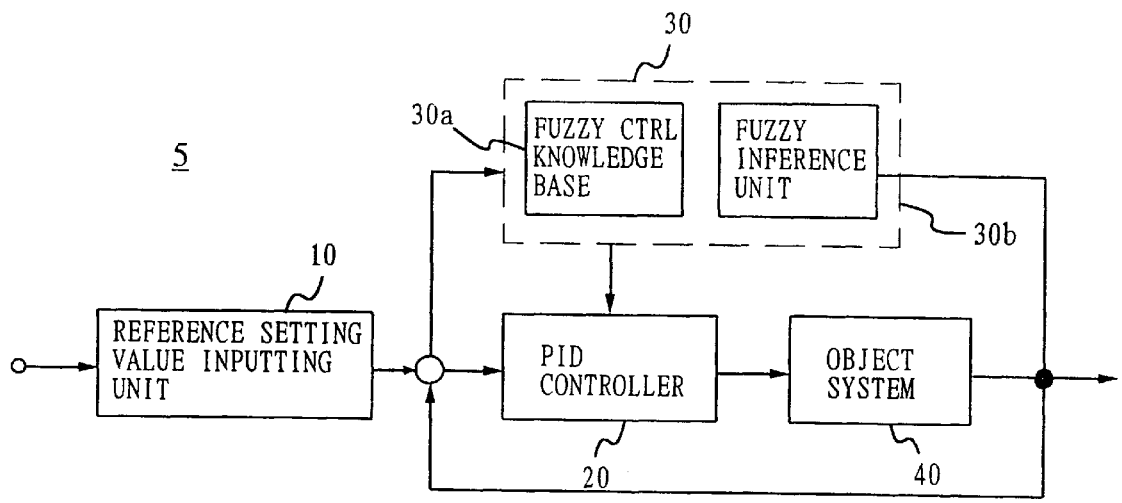
FIG. 1 is a block diagram showing a conventional system for controlling gains of a PID controller.
Figure 2:
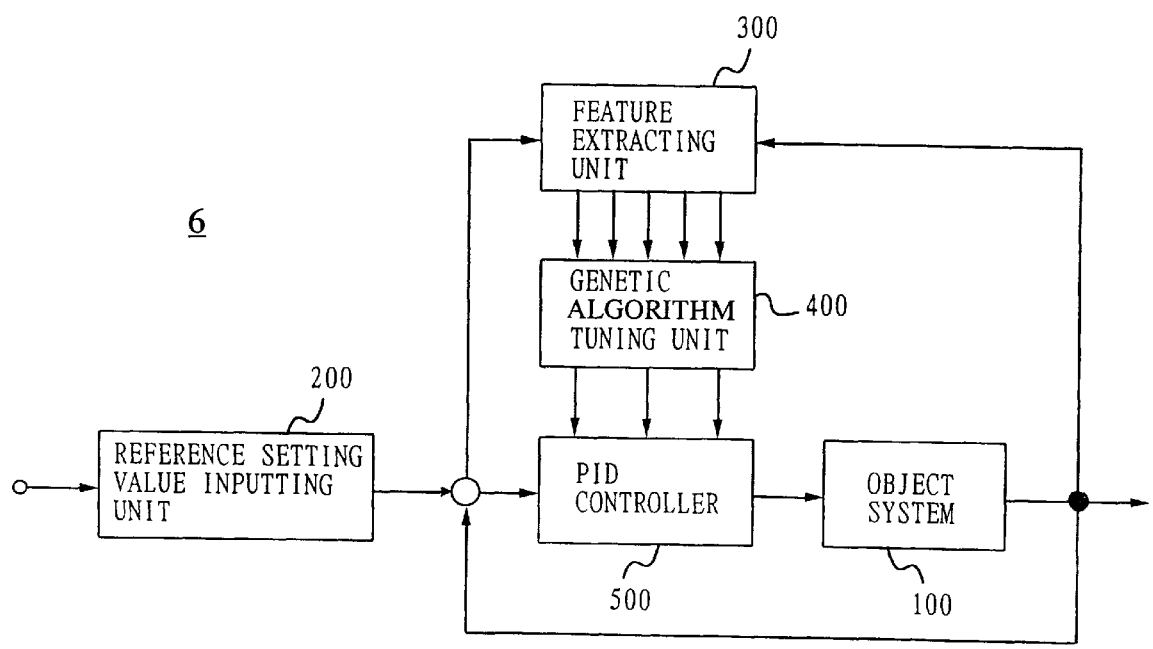
FIG. 2 is a block diagram showing a structure for controlling gains of a PID controller according to a preferred embodiment of the present invention.

FIG. 2 shows a structure 6 for controlling gains of a PID controller according to a preferred embodiment of the present invention. In FIG. 2, a reference setting value inputting unit 200 receives reference data to determine a gain of an object system 100, and a feature extracting unit 300 computes a difference between the reference data input through the reference setting value inputting unit 200 and an output of the object system 100, the integral value, differential value, rising time, settling time, overshot, and damping ratio of the output data of the object system 100 to extract a feature of the object system 100.

Genetic algorithm tuning unit 400 generates predetermined data for tuning PID gains in response to the output value (feature) of the feature extracting unit 300, and a PID controller 500 generates gain control signals with respect to the object system 100 in accordance with the data output from the genetic algorithm tuning unit 400.

Figure 4:
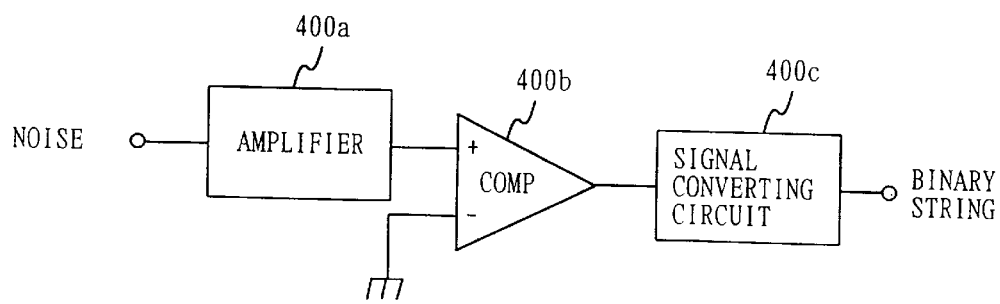
FIG. 4 is a block diagram showing a random number generating circuit for generating a first population to supply gain control signals from the genetic algorithm tuning unit of FIG. 2 to the PID controller.

FIG. 4 is a block diagram showing a random number generating circuit for generating a first population to supply the gain control signals from the genetic algorithm tuning unit 400 of FIG. 2 to the PID controller 500.

Referring to FIG. 4, the random number generating circuit is constituted by an amplifier 400a for amplifying an input noise, a comparator 400b for comparing the output signal of the amplifier 400a with a reference signal, i.e., zero level, to produce an output signal relative to an amplitude of the input noise, and a signal converting circuit for converting the output signal from the comparator 400b into a binary string.

A description is now given of an operation of the embodiment having the above-described structure.

In the present invention, gains of the PID controller 500 have to be set through a simple mathematical model with respect to the object system 100 to prevent erroneous operation of the object system 100.

In this case, if the mathematical model can not be obtained, the gains of the PID controller 500 have to be determined schematically using mostly a general Ziegler-Nichols method or "Relay Feedback" of Astrom.

According to the PID gain control signals output from the PID controller 500 in which the gains through the mathematical model are set, the object system 100 operates to produce data therefrom, and the produced data is supplied to the feature extracting unit 300 together with the reference setting value which is set by a user.

The reference setting value may be changed according to the object to be controlled. That is, the reference setting value is temperature in case of temperature control, it is level in case of level control, it is position in case of position control on controlling a motor, and it is velocity in case of velocity control.

The output data from the object system 100 is an output of the object system 100, its integral value, its differential value, rising time, settling time, overshot, and damping ratio being stored in a memory (not shown) of the feature extracting unit 300.

The feature extracting unit 300 performs a simple mathematical operation with output information of the object system 100 to obtain a difference between the reference setting value and the output of the object system 100, and next, to compute the integral value and the differential value of the output of the object system 100. When time passes to some extent, the rising time, settling time, overshot, and damping ratio are obtained.

Figure 3:
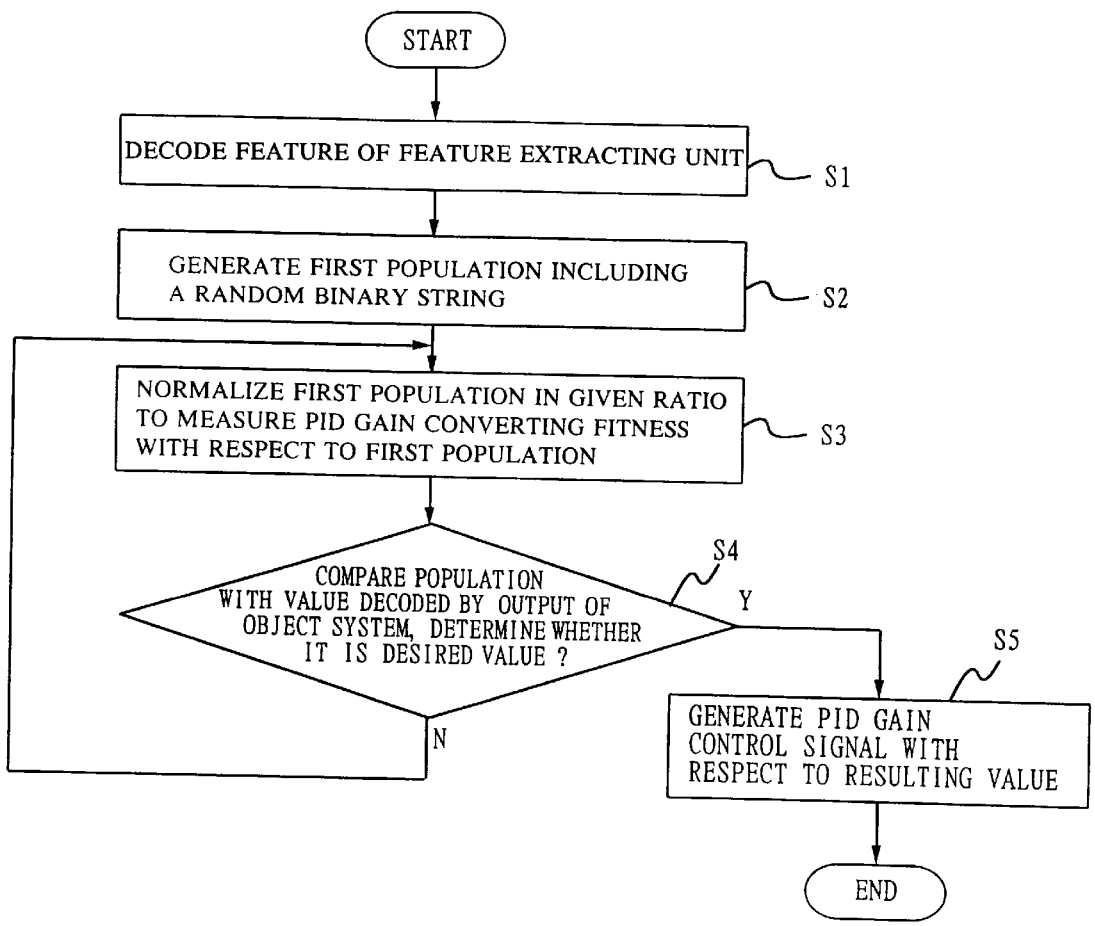
FIG. 3 is a flow chart showing a method of determining PID control gains in a genetic algorithm tuning unit of FIG. 2 according to a preferred embodiment of the present invention.

The genetic algorithm tuning unit 400 processes the feature output by the feature extracting unit 300 to generate PID gain control signals according to the procedures shown in FIG. 3.

First, the genetic algorithm tuning unit 400 decodes the feature output by the feature extracting unit 300 (S1), and generates a first population including a random binary string (S2). Then, the first population is normalized in a given ratio to measure PID gain converting fitness with respect to the first population (S3).

Thereafter, the normalized first population is compared with the value decoded in step S1 to determine whether it is a user's desired value (S4). If the desired value is obtained in step S4, the genetic algorithm tuning unit 400 generates three PID gain control signals with respect to the resulting value, which are supplied to the PID controller 500 to tune PID gains, i.e., proportional gain, integral gain, and differential gain. The PID controller 500 continuously controls the object system 100 in accordance with the obtained gains.

The random number generating circuit for generating the first population including the random binary string in step S2 is constituted by the embodiment as shown in FIG. 4.

First, after amplifying the input noise through the amplifier 400*a*, the amplified noise is supplied to the comparator 400*b* having the reference value set to zero to produce ±1 according to an amplitude of the input noise. Then, the output value of the comparator 400*b* is supplied to the signal converting circuit 400*c* to generate the first population including the random binary string.

The normalized population in step S3 of FIG. 3 is obtained as follows.

Referring to FIG. 5, the first population generated randomly is computed by a fitness function to extract values mere than a given value, thus generating a second population (S21).

Next, the second population is computed by means of the fitness function until a fixed value is obtained, thereby generating a third population (S22).

Adjacent populations among the third population are crossed over each other by a predetermined length bit to generate a fourth population (S23).

Then, the bits of the fourth population are mutated, respectively, to generate a fifth population (S24).

At this time, if a disturbance is abruptly received, system parameters are changed, or a load is changed to such an extent that the same can not be controlled by the PID controller 500 and the genetic algorithm tuning unit 400 operates again.

In another embodiment, the genetic algorithm tuning unit 400 generates the output wherein several bits control one gain, so that a variable extent of the gain is adjusted uniformly, but the teaching is very simple.

According to the present invention as above-described, since the present invention can be embodied by a simple analog circuit, an auto-tuning PID controller can be realized at low cost without the use of a memory or a microprocessor. Further, since it is possible to quickly and automatically control gains the PID controller such that the controller can produce a desired performance, it becomes easy to manufacture the PID controller in quantity. Also, since the PID controller can determine the gains by itself, it has a robustness, thereby improving the reliability.

While the invention has been described in conjunction with specific embodiments thereof, it is evident that several alternatives, modifications, and variations will be apparent to those skilled in the art in light of the foregoing description. Accordingly, it is intended to embrace all such alternatives, modifications, and variations as fall within the spirit and broad scope of the following claims.

I claim:

1. A unit for determining gains of a PID (Proportion, Integral, Differential) controller using a genetic algorithm, comprising:

reference setting value inputting means for inputting reference data to determine a gain of an object system;

feature extracting means for determining a difference between the reference data input through the reference setting inputting means and output data of the object system to extract a feature of the object system;

genetic algorithm tuning means for tuning PID gains in response to the feature output by the feature extracting means; and PID controlling means for generating gain control signals with respect to the object system relative to the tuned PID gains output from the genetic algorithm tuning means.

2. A unit according to claim 1, wherein the feature of the object system comprises a difference between the reference data and the output of the object system, and an integral value, differential value, rising time, settling time, overshot, and damping ratio of the output of the object system.

3. A unit according to claim 1, wherein the genetic algorithm tuning means comprises:

random number generating means for generating a first population to be compared with the feature, to control the PID gains, said random number generating means comprising an amplifier for amplifying an input noise, a comparator for comparing the amplified noise of the amplifier with a reference signal to produce an output signal relative to an amplitude of the input noise, and signal converting means for converting the output signal from the comparator into a binary string, to generate the first population.

4. A unit according to claim 1, wherein the feature extracting unit stores an integral value, differential value, rising time, settling time, overshot, and damping ratio of the object system, and selects the integral value, differential value, rising time, settling time, overshot, and damping ratio based upon the difference between the reference data and the output of the object system.

5. A method for determining gains of a PID (Proportion, Integral, Differential) controller using a genetic algorithm, comprising the steps of:

decoding a feature of an output value from an object system;

generating a first population including a random binary string;

normalizing the first population in a given ratio to measure PID gain converting fitness with respect to the first population; and comparing the normalized first population with the decoded output value, determining whether the normalized first population is a desired value, and generating PID gain control signals with respect to the resulting value if the desired value is obtained.

6. A method according to claim 4, wherein said step of normalizing a first population comprises the second population steps of:

determining the first population using a fitness function, and extracting a plurality of populations having values more than a predetermined value;

determining the second population using the fitness function until the determined second population value is obtained as a fixed value, and generating a third population having the fixed value;

crossing over each other adjacent populations among the third population by bits of a predetermined length and generating a fourth population; and mutating respective bits of the fourth population to generate a fifth population, the fifth population being the normalized first population.

7. A method of generating gain control signals representative of gains of a PID (Proportion, Integral, Differential) controller, comprising the steps of:

determining a difference between reference data for determining a gain of an object system and output data of the object, to extract a feature of the object system;

tuning PID gains in response to the feature; and generating the gain control signals for the object system based upon the tuned PID gains.

8. A method according to claim 7, wherein the step of determining a difference comprises the steps of:

pre-storing an integral value, differential value, rising time, settling time, overshot, and damping ratio of the output value; and selecting the integral value, differential value, rising time, settling time, overshot, and damping ratio based upon the difference between the reference data and the output of the object system.

9. A method according to claim 8, wherein the step of tuning PID gains comprises the steps of:

decoding the feature of the object system;

generating a first population including a random binary string based upon the decoded output;

normalizing the first population in a given ratio to measure PID gain converting fitness with respect to the first population; and comparing the normalized first population with the decoded output, determining whether the normalized first population is a desired value, and generating the gain control signals with respect to the normalized first population if the normalized first population is the desired value.

10. A method according to claim 9, wherein the step of normalizing a first population comprises the steps of:

randomly determining a first population using a fitness function to extract values more than a given value;

determining the second population using the fitness function until the determined second population value is a fixed value;

generating a third population having the fixed value;

crossing over each other adjacent populations among the third population by a predetermined bit length to generate a fourth population; and mutating respective bits of the fourth population to generate a fifth population, the fifth population being the normalized first population.

11. A method according to claim 8, wherein the step of normalizing a first population comprises the steps of:

randomly determining the first population using a fitness function to extract values more than a given value;

determining a second population using the fitness function until the determined second population value is a fixed value;

generating a third population having the fixed value;

crossing over each other adjacent populations among the third population by a predetermined bit length to generate a fourth population; and mutating respective bits of the fourth population to generate a fifth population, the fifth population being the normalized first population.

12. A method according to claim 7, wherein the step of tuning PID gains comprises the steps of:

decoding the feature;

generating a first population including a random binary string based upon the decoded output;

normalizing the first population in a given ratio to measure PID gain converting fitness with respect to the first population; and comparing the normalized first population with the decoded output, determining whether the normalized first population is a desired value, and generating the gain control signals with respect to the normalized first population if the normalized first population is the desired value.

13. A method according to claim 12, wherein the step of normalizing a first population comprises the steps of:

randomly determining a first population using a fitness function to extract values more than a given value;

determining the second population using the fitness function until the determined second population value is a fixed value;

generating a third population having the fixed value;

crossing over each other adjacent populations among the third population by a predetermined bit length to generate a fourth population; and mutating respective bits of the fourth population to generate a fifth population, the fifth population being the normalized first population.

14. A method according to claim 7, wherein the step of normalizing a first population comprises the steps of:

randomly determining the first population using a fitness function to extract values more than a given value;

determining a second population using the fitness function until the determined second population value is a fixed value;

generating a third population having the fixed value;

crossing over each other adjacent populations among the third population by a predetermined bit length to generate a fourth population; and mutating respective bits of the fourth population to generate a fifth population, the fifth population being the normalized first population.

* * * * *